United States Patent

[11] 3,603,798

[72] Inventor Larry D. Russell
San Jose, Calif.
[21] Appl. No. 47,443
[22] Filed June 18, 1970
[45] Patented Sept. 7, 1971
[73] Assignee The United States of America as
represented by the Administrator of the
National Aeronautics and Space
Administration

[54] HIGH INTENSITY RADIANT ENERGY PULSE
SOURCE HAVING MEANS FOR OPENING
SHUTTER WHEN LIGHT FLUX HAS REACHED A
DESIRED LEVEL
8 Claims, 4 Drawing Figs.
[52] U.S. Cl. .................................................. 250/211 J,
250/215
[51] Int. Cl. ...................................................... H01j 39/12
[50] Field of Search .......................................... 250/201,
206, 211 J, 215; 315/149

[56] References Cited
UNITED STATES PATENTS
2,716,717  8/1955  Dresser ........................ 250/201 X Primary Examiner—James W. Lawrence
Assistant Examiner—T. N. Grigsby
Attorneys—Darrell G. Brekke, Armand G. Morin, Sr. and John R. Manning ABSTRACT: A high intensity radiant energy pulse source is provided which requires no external cooling. A high intensity radiant energy source is located at one focal point of an ellipsoidal reflector and a shutter is positioned in the region of the other focal point. Monitoring means are provided for opening the shutter as soon as a predetermined flux level is reached. Additional means control the duration of time the shutter is open.

INVENTOR.
LARRY D. RUSSELL

BY

ATTORNEYS

3,603,798

HIGH INTENSITY RADIANT ENERGY PULSE SOURCE HAVING MEANS FOR OPENING SHUTTER WHEN LIGHT FLUX HAS REACHED A DESIRED LEVEL

The invention described herein was made by an employee of the United States Government and may be manufactured and used by or for the Government for governmental purposes without the payment of any royalties thereon or therefor.

BACKGROUND OF THE INVENTION

1. Field of the Invention

A high intensity radiant energy pulse source which can be controlled both as to flux level and duration.

2. Description of the Prior Art

Prior art devices designed to provide a pulse of high intensity radiant energy utilize a source operated continuously, a shuttering mechanism to provide a pulse, and provisions for dissipating the heat produced by continuous operation of the source, such as forced air, water, or other external cooling means. The cooling provisions have to cool not only the source and reflector, but also the shutter. The latter usually requires a rather elaborate mechanism necessary to place an externally cooled shield between the shutter and source, removing it just before pulsing the shutter, and replacing it before the shutter is damaged by excessive heat. The external cooling apparatus is complicated, cumbersome, and prevents easy portability, especially when water lines are involved.

The high intensity radiant energy pulse source of the present invention eliminates the requirement of having to provide external cooling and thus provides a simpler, more convenient and portable device.

SUMMARY OF THE INVENTION

The present invention provides a high intensity radiant energy pulse source which produces a pulse of high intensity thermoluminous radiation suitable for calibrating heat transfer gages such as those which are employed in shock tunnels to record transient temperatures. Since such transients are of very short duration, it is important to have a controlled source of high intensity radiant energy for calibrating the gages. The present invention provides such a source wherein both the flux level and the duration of the pulse are easily controlled under reproducible conditions.

The device of the present invention employs a high intensity radiant energy source such as a 750 watt tungsten-iodine quartz lamp located at one focal point region of a polished metal ellipsoidal reflector and a thin, pivoted-blade shutter located at the other focal point region. The object to be irradiated is placed immediately outside of the shutter so that it is substantially in the focal point region, thereby receiving maximum energy from the source.

The lamp source is turned on briefly and its intensity is monitored by a light-sensitive semiconductor flux sensor. When the flux reaches a desired level, which is determined by the sensor control circuit, the shutter is tripped, producing a radiant energy pulse of known intensity and duration. The device of the present invention includes a timing circuit and the pulse width can be varied from a few milliseconds to several seconds. With a 750 watt lamp, the rate of energy emission can be varied from about 5 to 25 watts per square centimeter. After the pulse, the lamp is turned off, so that the lamp is on only for slightly longer than is necessary to make an actual measurement, avoiding damage from excessive heat of the high intensity source without the need of water or forced-air cooling for heat dissipation.

The device of the present invention is entirely self-contained and is easily portable so that it is very convenient for the calibration and testing of thermal sensors and heat transfer gages.

DESCRIPTION OF THE PREFERRED EMBODIMENT

Figure 1:
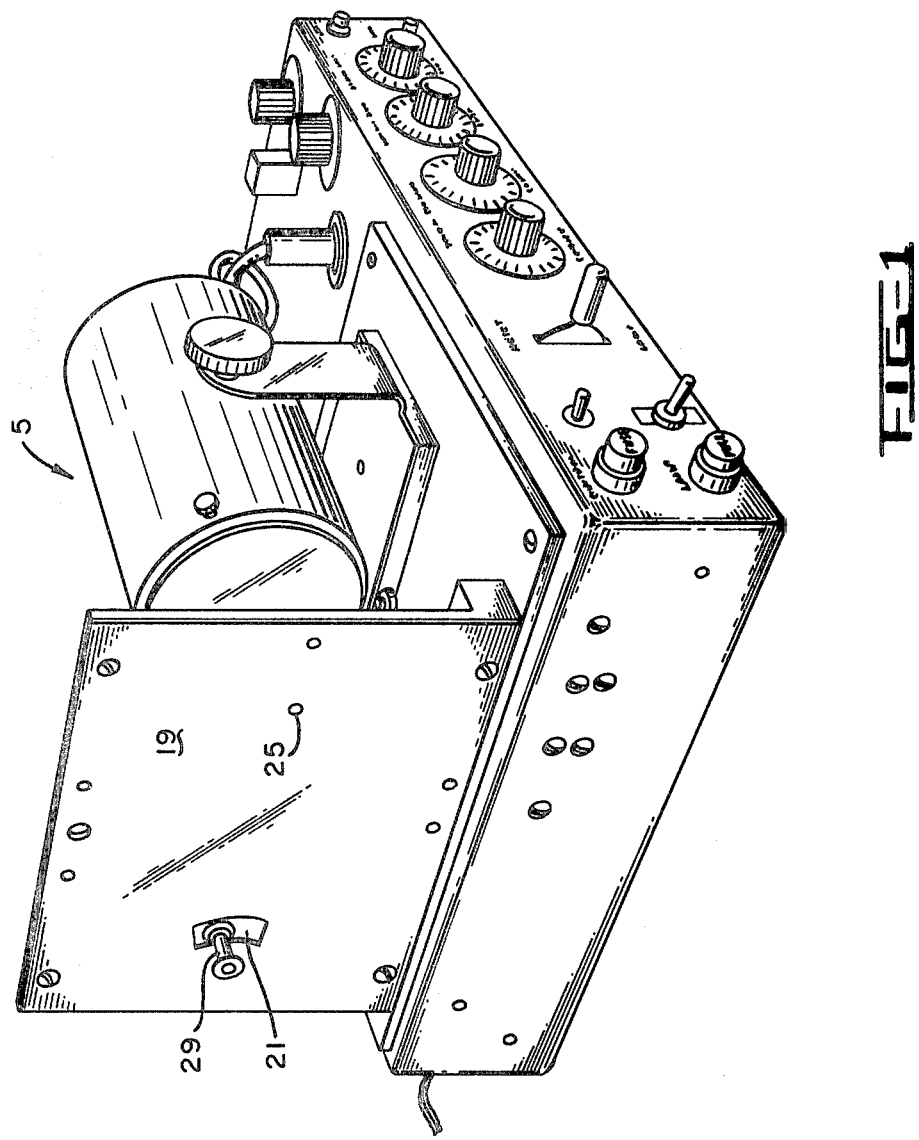
FIG. 1 is a perspective view of a device embodying the present invention.
Figure 2:
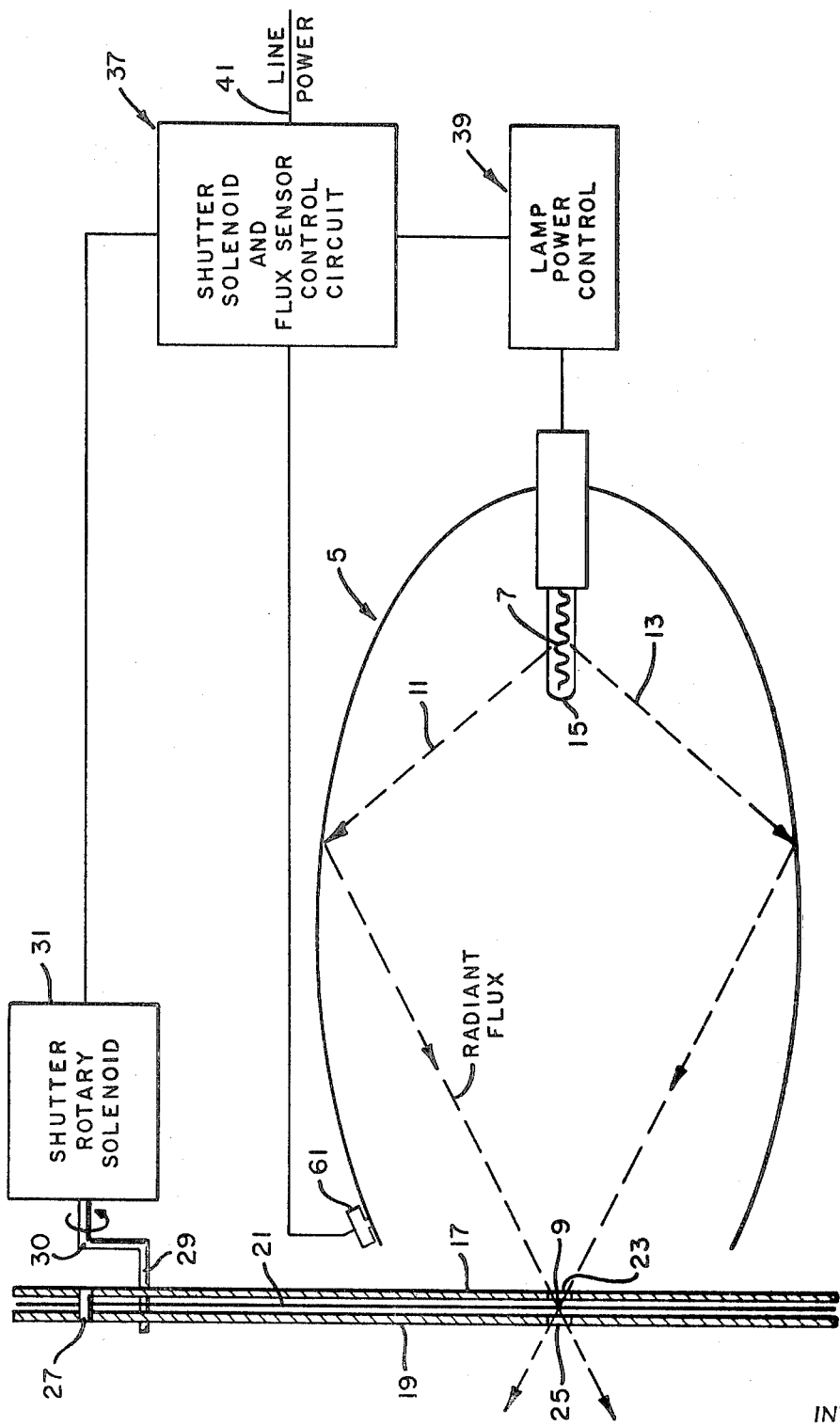
FIG. 2 is a semidiagrammatic view showing the operation of a device embodying the present invention.
Figure 3:
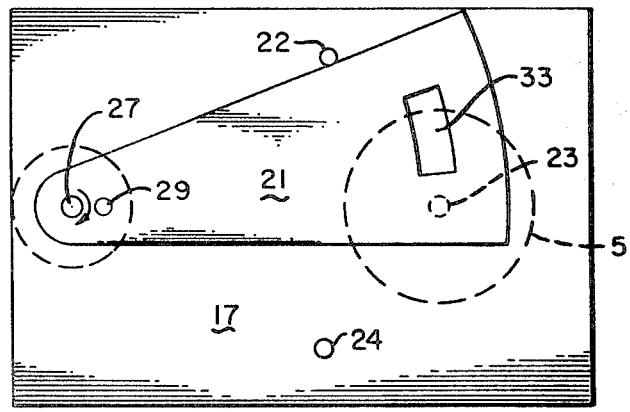
FIG. 3 is a front view of the shutter mechanism of the device shown in FIG. 1.

The general theory of operation of the present invention can best be understood from FIGS. 2 and 3 and the physical setup of the device is shown in FIG. 1. The device includes a polished ellipsoidal reflector generally designated 5 having conjugate foci designated 7 and 9. Imaginary rays for illustration purposes are shown at 11 and 13. At one of the points of focus 7, a high intensity radiant energy source 15 is placed. This can conveniently be a 750 watt tungsten-iodine quartz lamp, although other sources of radiant energy such as an arc lamp or a high-pressure gas discharge lamp may be used.

One end of the ellipsoidal reflector terminates substantially at the focal point 9 and a rear shutter guide 17 is attached thereto. A front shutter guard 19 is space a short distance from the rear shutter guide and the shutter proper 21 fits between the two. An upper stop 22 and a lower stop 24 are provided to limit travel of the shutter. The rear guide 17 has a small aperture 23 with a corresponding aperture 25 in the front shutter guide 19.

In FIG. 3, the front shutter guide has been removed to show the structure of the shutter itself. The shutter 21 can conveniently be of triangular shape and is mounted for rotation on a bearing 27 between the two shutter guides and has a crank arm 29 attached thereto which is turned by shaft 30 of the rotary solenoid 31. Solenoid 31 is spring loaded so that if it is not energized the shutter will be biased against stop 22. The shutter has an elongated slot 33 therein so that as the shutter rotates on the pivot 27, the slot will be brought into the alignment with apertures 23 and 25 for making the exposure and after passing the apertures the shutter will remain against stop 24 until the current is shut off. Instead of the stops illustrated, the solenoid can be provided with internal stops. Obviously the length of slot 33, together with the control circuitry which regulates the speed at which the rotary solenoid operates, will determine the pulse length.

A flux sensor 61 is mounted at some convenient point on the ellipsoidal reflector and connected by suitable wiring to the shutter solenoid and flux sensor control circuit generally designated 37 which is in turn connected to the shutter rotary solenoid 31, the lamp power control 39 and power line 41. Additionally, as is shown in FIG. 1, the crank arm 29 can extend in front of the front shutter blade guide 19 for manually actuating the shutter during set up and testing.

The broad idea of operation is that one manually turns on the lamp 15 and as the intensity of the lamp rises to the power output desired, the flux sensor 61 will cause the shutter rotary solenoid to turn and open the shutter. The pulse length will be determined by the speed of the rotary solenoid which is set by the solenoid current control 51. The switch to turn on the lamp is preferably of the spring return type so that the operator holds it down only until the pulse has been produced by the opening and closing of the shutter and the switch is then immediately released. In this manner, the light source is only on for a short period of time, i.e. only slightly longer than the pulse itself, and it is thus not necessary to provide for any eternal cooling of the source.

Figure 4:
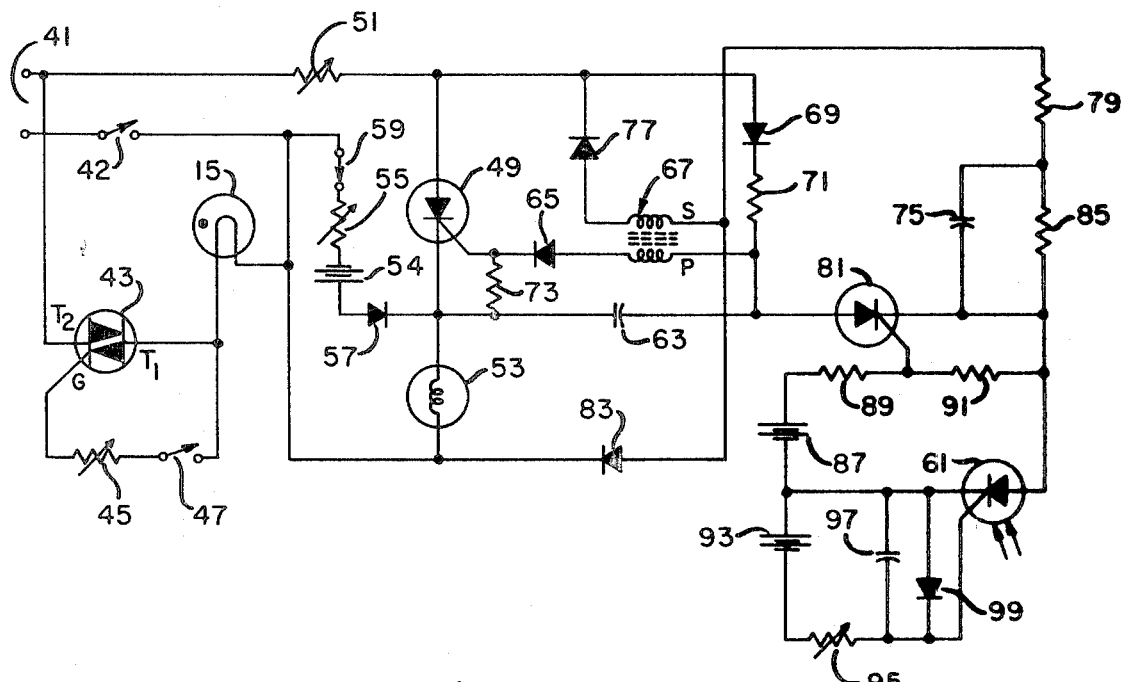
FIG. 4 is a schematic diagram of a suitable control circuit for use in the present invention.

Referring now specifically to FIG. 4, the radiant energy source 15, which in the example illustrated is a tungsten-iodine quartz lamp of 750 watts rating, has one terminal connected to one side of the AC line 41 which can be a conventional 115 V. 60 Hz. The other terminal of lamp 15 is connected to a momentary contact switch 47 and also to terminal T1 of triac 43. Terminal T2 of triac 43 is connected to the opposite side of the AC line while the gate terminal G of triac 43 is connected through a variable resistor 45 to the momentary contact switch 47. The operation of the triac (bidirectional triode thyristor) is well known to those skilled in the art and will not be described in detail except to say that normally the triac will block voltage in both directions until a voltage is applied to the gate. Since the voltage applied to the gate is alternating, the gate will control flow in both directions and the level of the applied voltage will determine the fraction of the cycle during which the triac conducts. The amount of voltage supplied to the gate, and thus the energy passed and the intensity of the lamp 15 can be regulated by the variable resistor 45. The circuitry heretofore described thus corresponds with block 39 of FIG. 2.

The balance of the circuitry serves to control the operation of the shutter, i.e. to open the shutter when the desired intensity is reached and to close the shutter after the desired time interval. A silicon controlled rectifier SCR 49 and a variable resistance 51 are in series across the power line with the coil 53 of rotary solenoid 31. When SCR 49 is conducting, current flows through the solenoid and variable resistor 51 controls the amount of current and thus the solenoid rotation speed. This, along with the adjustment of the holding current for the solenoid, hereinafter described, determines the radiation pulse length.

The holding current is provided by the battery 54 and adjusted by variable resistor 55. Diode 57 blocks current flow from SCR 49 into battery 54. The holding current is adjusted so that it is sufficient to overcome the solenoid return spring and maintain the shutter against stop 24. This prevents another pulse from occurring if the lamp should still be on. Switch 59 is of the normally closed type and opening the switch releases the shutter blade to return to its initial position.

The remaining control circuitry allows for SCR 49 to conduct for one complete half-cycle of line power only when the lamp flux is sufficient to activate the light-activated, silicon-controlled rectifier LASCR 61. The single half-cycle of line power drives the shutter solenoid 53 to produce a single pulse from the lamp.

SR 49 is triggered into conduction by a current pulse the discharge of capacitor 68 through diode 65 and the primary winding P of a saturable ferrite core transformer 67.

During half-cycles of the AC line supply, when the SCR 49 anode is positive, current flows through diode 69 and resistor 71. If the transformer 67 core is not saturated, its primary winding impedance is high and 63 is charged by the positive half-cycle of the line through resistor 71. When 63 has charged enough for current to flow through and saturate the transformer, the primary impedance of the transformer drops and 63 discharges through it, triggering SCR 49. If the core is already saturated, 63 will not charge and SCR 49 will not be triggered. Resistor 73 sets the current level which flows into SCR 49.

During the negative half-cycles of the line power, capacitor 75 is charged through diode 77, the secondary winding S of 67, resistor 79, capacitor 63 and SCR 81 when the latter is conducting. This current unsaturates the core of transformer 67, and on the next half-cycle 63 will charge, 67 saturate again, and SCR 49 triggers. When SCR 49 and SCR 81 are conducting, 75 is charged through SCR 81, 79 and diode 83. With capacitor 75 fully charged, the core resetting current of the negative half-cycle through the secondary of 67 does not exist and the core remains saturated, preventing further triggering of SCR 49. Resistor 85 tends to discharge capacitor 75 and when SCR 81 ceases to conduct for a time greater than that equal to the time constant of resistor 85 and capacitor 75, capacitor 75 discharges, allowing reset current to flow the next time SCR 81 conducts on a negative half-cycle.

The conduction of SCR 81, and hence the triggering of SCR 49, is controlled by the LASCR 61. SCR 81 conducts when LASCR 61 allows a trigger current to flow from battery 87 through resistors 89 and 91. The LASCR 61 conducts when the radiant flux on it is sufficient to overcome the negative gate bias provided by battery 93 through variable resistor 95 across capacitor 97 and diode 99. This bias is adjusted with 95 and determines the radiant flux level at which LASCR 61 conducts and the shutter trips. The pulse source is calibrated so that a setting of this bias control corresponds to a particular radiant flux density.

It will be understood that the pulse length will be determined by the length of the slot 33 in the shutter and also by the speed at which the rotary solenoid operates. Resistor 51 provides control for shutter speed while resistor 55 controls holding or bias current. After a measurement has been taken, the operator would release switch 47 shutting off current to the lamp 15 so that the lamp 15 is only energized for a period slightly longer than the actual time necessary to provide the actual pulse. After releasing switch 47, the operator would then momentarily open switch 59 which would release the holding current on the shutter solenoid 53, allowing the shutter to return to its upper position as is shown in FIG. 3.

In one practical embodiment of the invention, the triac 43 was a GE 5100D3; SCR 49 was a 2N1774, and SCR 81 was a C106B1. LASCR 61 was a GE L9B while all of the diodes were 1N2071. Although certain components have been specified, it will be understood that this is for illustration purposes only and that many changes can be made in the components or the circuitry without departing from the spirit of this invention.

I claim:

1. A radiant energy pulse source comprising in combination:
   an ellipsoidal reflector having conjugate foci F1 and F2,
   a source of radiant energy at F1,
   a shutter substantially at F2,
   means for supplying power to said source of radiant energy,
   first control means for opening said shutter when said source of radiant energy has reached a desired energy level and,
   second control means for determining the length of time that said shutter is open.

2. The structure of claim 1 wherein the first control means comprises a radiant energy flux sensor located on the surface of said ellipsoidal reflector.

3. The structure of claim 1 wherein means are provided for controlling the flux level of the source of radiant energy.

4. The structure of claim 3 wherein a triac control circuit is used to control the flux level of radiant energy.

5. The structure of claim 1 wherein said shutter is actuated by a rotary solenoid, said rotary solenoid being actuated by a flux sensor mounted on the ellipsoidal reflector.

6. The structure of claim 5 wherein the speed of the rotary solenoid is controlled, said speed control determining the length of time that the shutter is open.

7. The structure of claim 6 wherein a light-activated, silicon-controlled rectifier is utilized as the flux sensor, said light-activated silicon-controlled rectifier serving to control said solenoid.

8. A radiant energy pulse source comprising:
   an ellipsoidal reflector having a first focus and second focus;
   a radiant energy source located at said first focus;
   a radiant energy shield having an aperture therein, said aperture being substantially at said second focus;
   shutter means for controlling the passage of radiant energy through said aperture;
   said shutter means normally being closed so as to block the passage of radiation through said aperture;
   means for energizing said radiant energy source;
   monitoring means for opening said shutter means when said radiant energy from said source reaches a predetermined level, and
   means for controlling the duration of time said shutter means is open.